(No Model.)

G. T. EAMES.
WOODEN RIM SPLIT PULLEY.

No. 411,651.  Patented Sept. 24, 1889.

Witnesses:
A. Ruppert
E. Kruse

Inventor:
Gardner T. Eames
by Gifford W. T. Howard
Atty.

UNITED STATES PATENT OFFICE.

GARDNER T. EAMES, OF RACINE, WISCONSIN.

WOODEN-RIM SPLIT PULLEY.

SPECIFICATION forming part of Letters Patent No. 411,651, dated September 24, 1889.

Application filed October 11, 1888. Serial No. 287,792. (No model.) Patented in Canada July 6, 1888, No. 29,455.

*To all whom it may concern:*

Be it known that I, GARDNER T. EAMES, of Racine, in the county of Racine and State of Wisconsin, have invented certain new and useful Improvements in Wooden-Rim Split Pulleys, (for which Letters Patent No. 29,455 were granted in Canada July 6, 1888,) of which the following is a specification, reference being had to the accompanying drawings, and to the letters of reference marked thereon.

The object of my invention is to lighten, strengthen, and cheapen pulleys of this class; and it consists in the details of improvement hereinafter specified.

Figure 1:
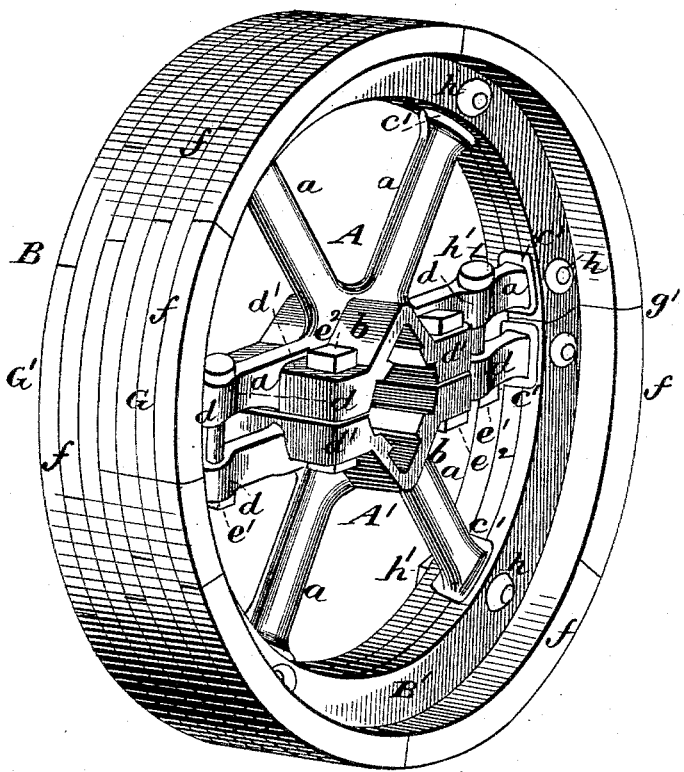
Figure 2:
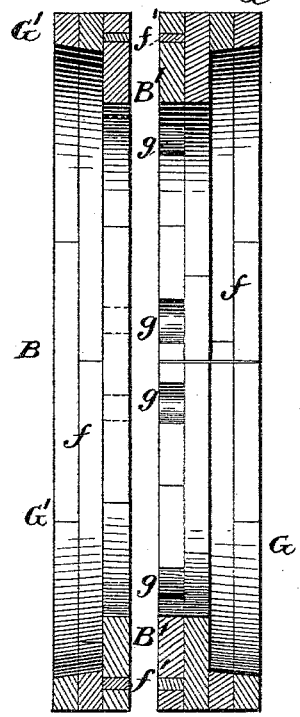
Figure 3:
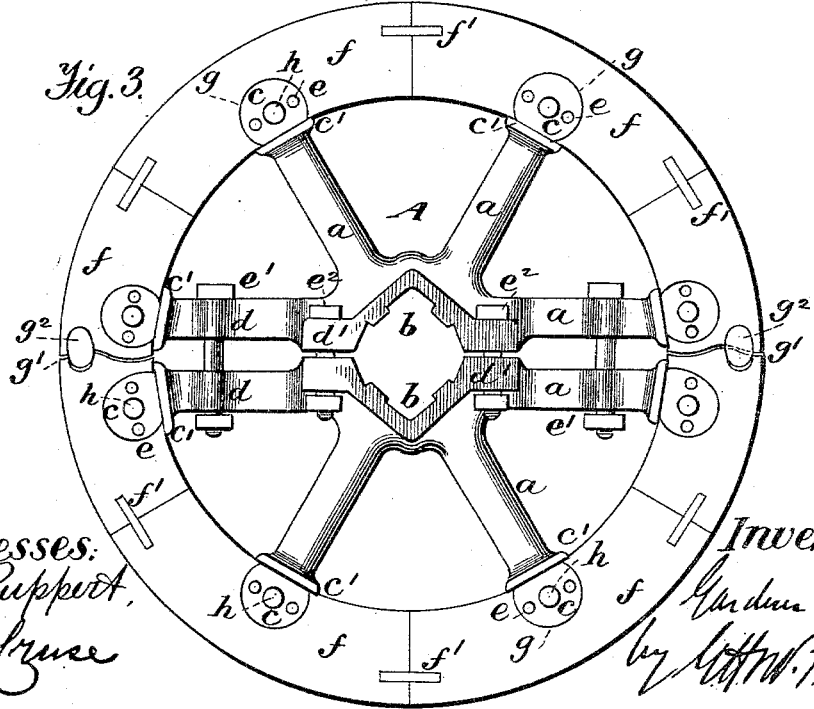

In the accompanying drawings, Figure 1 is a perspective view of a pulley embodying my invention. Fig. 2 is a sectional view of the rim divided in two parts. Fig. 3 is a plan view of the spider embedded in one of the rings of the rim.

Similar letters of reference indicate similar parts in the respective figures.

A A' represent two halves of a spider, or that part of the pulley constituting the hub and arms, and B represents the wooden rim. The two halves of the spider are alike, except that they are right and left. The arms are represented by $a$ and the hub parts by $b$.

The end of each arm is provided with a plate portion $c$, preferably of a circular form, and shoulder $c'$. The faces of the plate portions $c$ are provided with pins or projections $e$, for a purpose hereinafter specified. The adjacent arms of each half of the spider are parallel to each other and provided with perforated bosses or enlargements $d$, the two halves being in part secured together by bolts and nuts $e'$, the bolts passing through the perforated bosses, as shown. The hub parts of the spider are provided with the ordinary lugs $d'$ and securing-bolts $e^2$. The rim B is built up of successive ring portions $f$, each ring being formed of segments of circles which are connected together at their joints by straight dowels $f'$, as shown. The rings forming the central portion of the rim are deeper than those forming the two faces thereof, a central web or drop-flange B' being thus formed, and in this web or flange the plate portions $c$ of the spider are embedded.

In constructing the pulley, the rim is first made in two parts, the several rings being glued together. One of the parts G contains one more ring than the other part G', as shown in Fig. 2. This extra ring is of the same thickness as the plate portions $c$ of the spider. In this extra ring, at its inner edge, are bored holes $g$ for the reception of the plate portions $c$, the holes being so bored that the shoulders $c'$ of the arms will abut against the inner edge of the web. The extra ring is also provided with two recesses $g'$ near its outer edge, the recesses being directly opposite each other and at points so that a line drawn between the adjacent and parallel arms of the spider would cut them, as shown in Fig. 3. A dowel $g^2$ is made to fit in each recess, but is not inserted until after the rim has been divided transversely. When the spider has been fitted into the web of the part G, the other part G' is glued and compressed on the part G, thus embedding the plate portions $c$ of the spider in the web B' of the completed rim.

In small light pulleys the pins or projections $e$, which will be embedded in the wood, and the glue will be sufficient to hold the two parts G G' and the spider securely together; but in larger and heavier pulleys I prefer to still further secure the several parts together by means of the bolts $h$, which pass through the web and the center of the plate portions $c$, and their nuts $h'$.

When the pulley and spider are secured together, I divide the rim transversely on a line, preferably irregular, directly between the adjacent and parallel arms of the spider. Both ends of each half of the pulley will then contain parts of the recesses $g'$, before mentioned. The dowels $g^2$ are glued into the recesses in the ends of one of the halves, a portion thereof projecting, which, when the two halves of the rim are brought together, will fit into the recesses in the other half. The object of the dowels is to keep the two halves of the rim in place when they are put together. The dowels may be of iron, wood, or any suitable material.

In another application, Serial No. 287,793, filed herewith, claim is made for my improvement in the hub portion of the pulley, which part is not herein particularly described.

The advantages of my invention, as herein described and claimed, consist in simplicity, strength, and cheapness of manufacture. Pulleys constructed according to my invention are also lighter and offer less resistance to the air than pulleys constructed without the central web in the rim.

I disclaim, broadly, a pulley having a rim and shouldered arms, the latter embedded at their outer ends in said rim, and provided with integral transverse anchoring-pins extending laterally into the material substance of the rim; but, Having described my invention, I claim—

1. In a wooden-rim split pulley, the rim having a central drop flange or web and a spider the arms of which have shouldered plate portions embedded in the central flange or web, said plate portions being provided with integral pins or projections, combined with bolts passing entirely through the web and plate portions, substantially as specified.

2. In a wooden-rim split pulley, the combination, with the rim built up of successive ring portions, the central rims being deeper than the outer ones, whereby a central drop flange or web is formed in said rim, of a spider the arms of which have shouldered plate portions on their ends of a thickness equal to that of the central ring of the drop flange or web and into which they are embedded, said plate portions being also provided with integral pins or projections embedded in the rings on each side of the said central ring, and bolts passing through the plate portions and the web, substantially as specified.

In testimony whereof I have hereunto set my hand and seal.

GARDNER T. EAMES. [L. S.]

Witnesses:
H. A. COOPER,
W. E. LEE.